United States Patent
Girondi

(10) Patent No.: US 9,447,758 B2
(45) Date of Patent: Sep. 20, 2016

(54) FILTER FOR INTERNAL COMBUSTION ENGINES

(75) Inventor: Giorgio Girondi, Mantova (IT)

(73) Assignee: UFI FILTERS S.P.A., Porto Mantovano (Mantova) (IT)

( * ) Notice: Subject to any disclaimer, the term of this patent is extended or adjusted under 35 U.S.C. 154(b) by 912 days.

(21) Appl. No.: 13/636,750

(22) PCT Filed: Feb. 11, 2011

(86) PCT No.: PCT/IB2011/000270
§ 371 (c)(1),
(2), (4) Date: Jan. 2, 2013

(87) PCT Pub. No.: WO2011/117693
PCT Pub. Date: Sep. 29, 2011

(65) Prior Publication Data
US 2013/0098822 A1     Apr. 25, 2013

(30) Foreign Application Priority Data
Mar. 24, 2010  (IT) .............................. RE2010A0025

(51) Int. Cl.
*F02M 37/22*  (2006.01)
*B01D 29/21*  (2006.01)
*B01D 29/96*  (2006.01)

(52) U.S. Cl.
CPC .............. *F02M 37/22* (2013.01); *B01D 29/21* (2013.01); *B01D 29/96* (2013.01);
(Continued)

(58) Field of Classification Search
CPC ............ B01D 29/21; B01D 2201/291; B01D 2201/4084; B01D 2201/4015; B01D 2201/4007; F02M 37/22

USPC ........... 210/236, 454, 440, 443, 442, 493.2, 210/450
See application file for complete search history.

(56) References Cited

U.S. PATENT DOCUMENTS 4,626,348 A * 12/1986 Stone ..................... B01D 27/08
210/248
4,882,051 A    11/1989 Itoh
(Continued)

FOREIGN PATENT DOCUMENTS

DE        4344586 A1    6/1995
DE      20211556 U1   11/2003
(Continued)

*Primary Examiner* — Madeline Gonzalez
(74) *Attorney, Agent, or Firm* — Volpe and Koenig, P.C.

(57) ABSTRACT

A filter for internal combustion engines of vehicles, comprising: an external casing (11) and an upper closing cover (12), which close an internal chamber (13) having an inlet for the liquid to be filtered and an outlet for filtered liquid; a filter cartridge (20) having a tubular filter means (21) located internally of the internal chamber (13) which separates the chamber (13) into a first zone communicating with the inlet and a second zone communicating with the outlet, and a lower plate (22) joined to a lower end of the filter means (21); the filter means being removably fixed to the casing (11) such as to remain internally of the casing when the casing is separated from the cover; the lower plate comprising hooking teeth (31), developing axially and having an elastic action in a radial direction; the base of the casing comprising a generally cylindrical surface sub-divided into a number of sectors which is equal to a number of hooking teeth (31), each sector defining a hooking zone (43) for axially constraining the hooking teeth (31) in a snap-fastening.

5 Claims, 5 Drawing Sheets

(52) U.S. Cl.
CPC .................. *B01D 2201/291* (2013.01); *B01D 2201/4007* (2013.01); *B01D 2201/4015* (2013.01); *B01D 2201/4084* (2013.01)

(56) References Cited

U.S. PATENT DOCUMENTS

| | | | |
|---|---|---|---|
| 6,096,207 A | * | 8/2000 | Hoffman et al. ............. 210/232 |
| 6,679,990 B2 | * | 1/2004 | Reinhart ....................... 210/232 |
| 7,141,163 B2 | * | 11/2006 | Girondi ......................... 210/232 |
| 7,497,887 B2 | | 3/2009 | Baumann |
| 2005/0000886 A1 | | 1/2005 | Reynolds et al. |

FOREIGN PATENT DOCUMENTS

| | | |
|---|---|---|
| DE | 2004038814 A1 | 3/2006 |
| WO | 9509037 A1 | 4/1995 |
| WO | 2004091750 A1 | 10/2004 |

* cited by examiner

FILTER FOR INTERNAL COMBUSTION ENGINES

TECHNICAL FIELD

The invention relates to a filter for liquids for internal combustion engines of vehicles, in particular oil and diesel.

BACKGROUND ART

For some years filters have been made having an external casing and an upper closing cover, which define an internal chamber having an inlet for the liquid to be filtered and an outlet for the filtered liquid, and a filter cartridge having a tubular filter means, located internally of the internal chamber, which separates the chamber into a first zone communicating with the inlet and a second zone communicating with the outlet.

The filter cartridge is constrained to the upper cover by means of an upper plate joined to the upper end of the filter means and, when it is worn out and needs to be replaced, is separated from the cover and replaced with a new cartridge.

The filters are favoured at present because there is no need to dispose of and destroy the whole filter but only the worn-out filter cartridge.

The accessibility of the cartridge is also facilitated by the fact that as it is constrained to the closing cover of the casing, when the casing is opened the cartridge follows the cover, exiting from the fluid it is immersed in without there being any need to access it with tools and without any need to shake it or unblock it, causing dirt to detach from it, which is always damaging.

To constrain the cartridge and the cover to one another, it is known to realise first hooking elements and second hooking agents to realise a reciprocal snap-fastening, where the first hooking elements (or the second hooking elements) are joined to the cover and project axially towards the inside of the chamber and, vice versa, the second hooking elements (or the first hooking elements) are joined to the upper plate and project axially towards the upper cover.

A drawback connected to these filters is that since the used filter cartridge, impregnated with liquid, is attached to the cover, when the external casing is removed, separating it from the cover, the liquid drips from the cartridge, fouling not only the operator but also the surrounding environment and parts of the engine.

The aim of the present patent is to obviate the above-described drawback.

Disclosure of Invention

The aim is attained by a filter having the characteristics recited in claim 1.

Primarily the objective is attained by making the cartridge removably fastened to the casing such as to remain internally of the casing when the casing is separated from the cover.

The invention further comprises advantageous means for removably fastening the cartridge to the bottom of the cover, such as to facilitate the engaging/disengaging rapidly and securely.

The invention is based on the fact that it comprises first hooking elements which are solidly constrained to the casing and exhibiting hooking teeth, developing axially and having an elastic action in a radial direction, and second hooking elements which are solidly constrained to the cartridge, which have a generally cylindrical surface that is subdivided into a number of equal sectors which is equal to the hooking teeth, where each sector defines a hooking zone for axially constraining the hooking teeth in a snap-fastening arrangement, and a disengaging zone, located by a side of the hooking zone, destined to free the hooking teeth from the constraint with the hooking zone following a rotation, over a limited angle, of the cartridge with respect to the casing.

BRIEF DESCRIPTION OF THE DRAWINGS

The advantages and constructional-functional characteristics of the invention will better emerge from the detailed description that follows, which with the aid of the accompanying figures of the drawings illustrate a preferred embodiment given by way of non-limiting example.

BEST MODE FOR CARRYING OUT THE INVENTION

Figure 1:
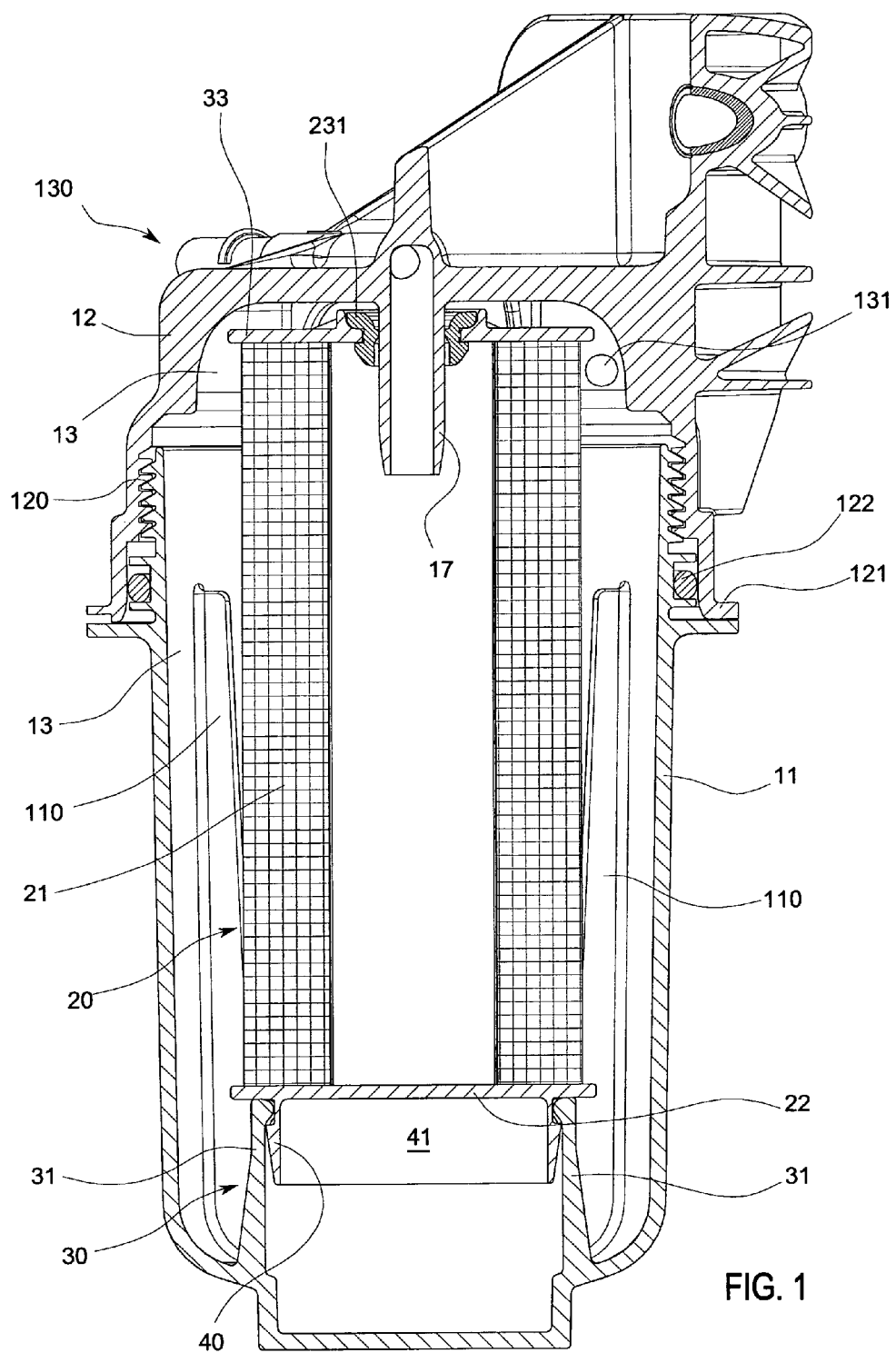
FIG. 1 is an axial section of a filter of the invention.
Figure 2:
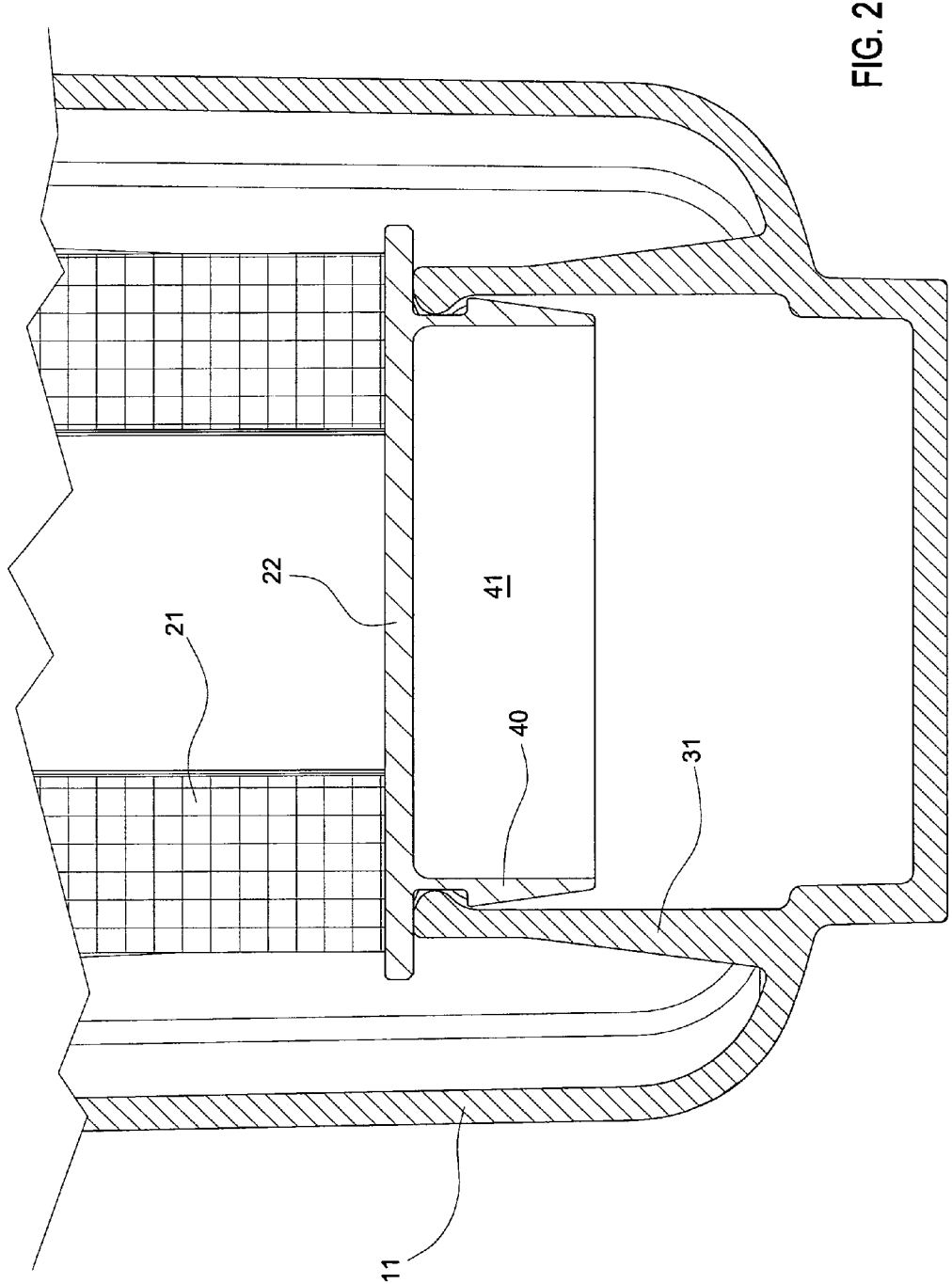
FIG. 2 is an enlarged view of the lower portion of FIG. 1.
Figure 4:
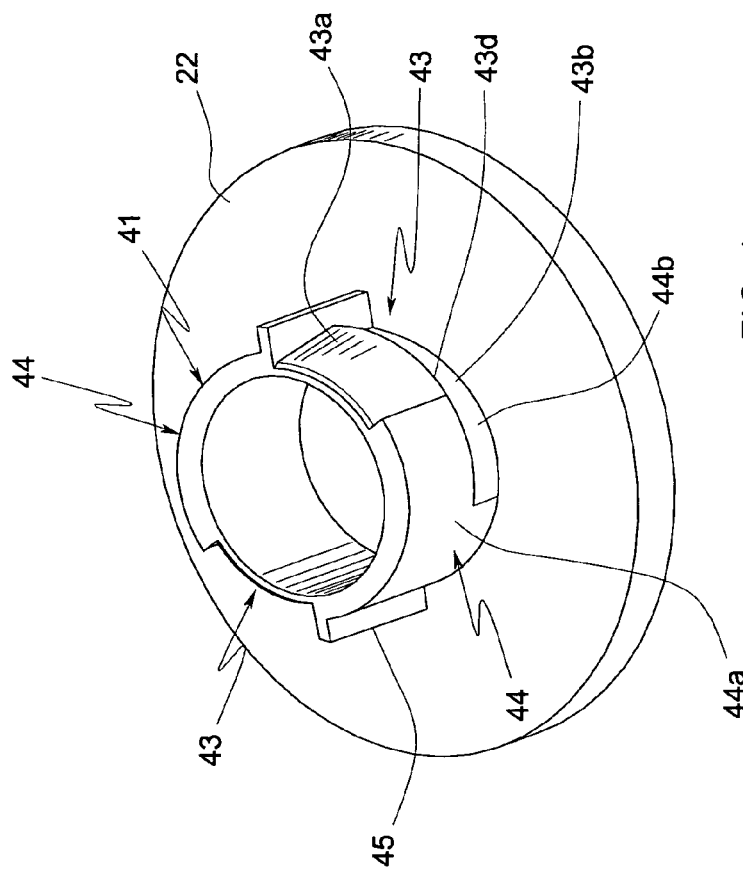
FIG. 4 is an upturned perspective view of the detail of FIG. 3.

The filter comprises an external casing 11, in particular a generally cylindrical casing, superiorly open and having an upper closing cover 12, which closes an internal chamber 13, generally cylindrical.

The cover 12 comprises threaded means 120 for coupling with means present on the casing, as well as abutting elements 121 and sealing elements 122 for defining the exact position and realising a hydraulic seal between the cover and the casing thanks to the gasket 122.

The chamber 13 affords an inlet 130 for the liquid to be filtered which, in the embodiment illustrated in the figures is located laterally, on the cover, and an outlet 131 for the filtered liquid which, once more with reference to the embodiment illustrated in the figures, is located on the upper cover 12.

A filter cartridge 20 is located internally of the chamber 13, which filter cartridge 20 has a tubular filter means 21 located internally of the internal chamber 13 which separates the chamber into a first zone communicating with the inlet 130 and a second zone communicating with the outlet 131.

The cartridge 20 further comprises a lower plate 22, in the form of a circular plate, which entirely and snugly covers the flat and annular lower surface of the filter means 21 and is solidly joined thereto. The cartridge 20 finally comprises an upper plate 23, in the form of a circular ring, which entirely and snugly covers the flat and annular upper surface of the filter means 21 and is solidly joined thereto.

In the embodiment illustrated in the figures, the cover 12 comprises an axial tube 17 which passes through an opening afforded in the centre of the upper plate 23. A gasket 231 provides a hermetic seal between the plate 23 and the tube 17.

The tube 17 communicates, through the cover, with the inlet conduit 130 of the liquid to be filtered.

The filter further possesses first hooking elements and second hooking elements combining with one another to realise a reciprocal snap-fastening.

In the embodiment illustrated in the figures, the first hooking elements 30 are joined to the casing 11, at the base thereof, forming a single body with the wall of the casing, and axially extend upwards internally of the chamber 13, while the second hooking elements 40 are joined in a single body to the lower plate 22 and axially project downwards, towards the base of the casing.

In the invention, the first hooking elements comprise two or more hooking teeth 31, having axial direction and elastic action in a radial direction, while the second hooking elements comprise a tubular body 41 having an external surface which is generally cylindrical and sub-divided into a number of sectors which is the same as the number of hooking teeth 31.

Figure 3:
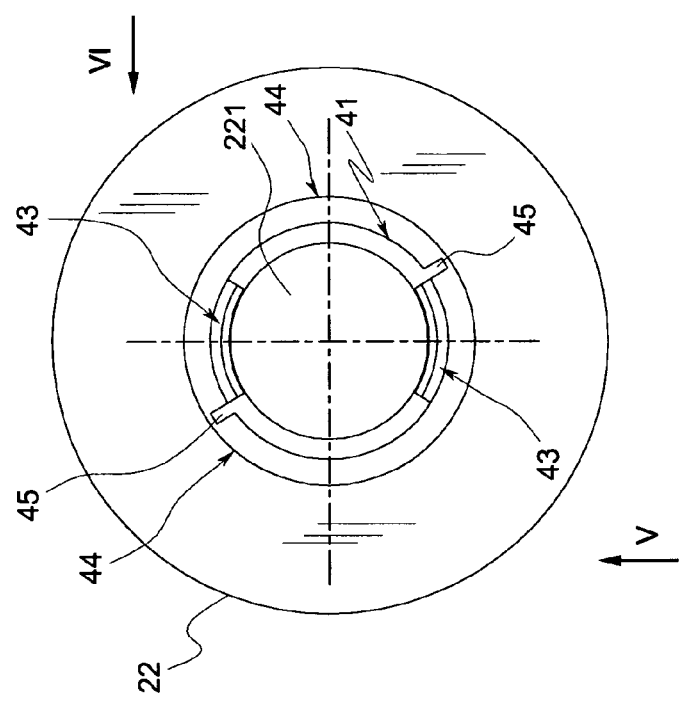
FIG. 3 is a plan view from below of a detail of FIG. 2.
Figure 7:
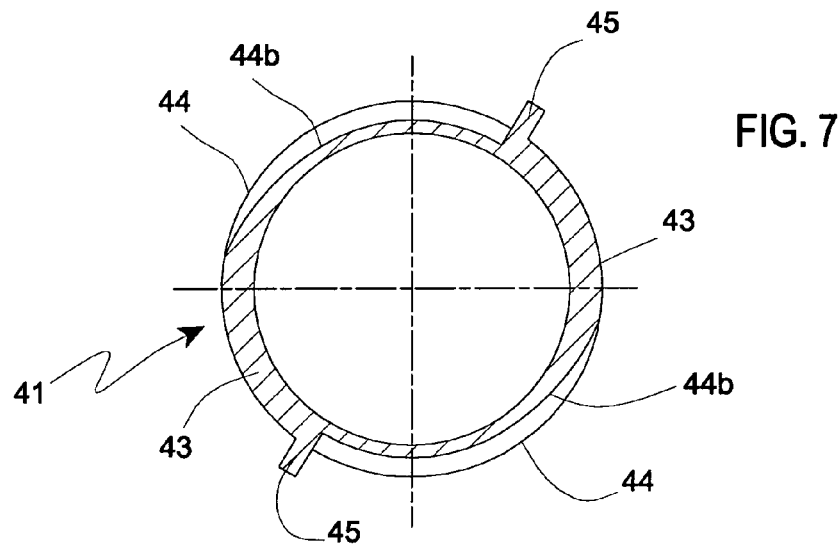
FIG. 7 is section VII-VII of FIG. 5.
Figure 5:
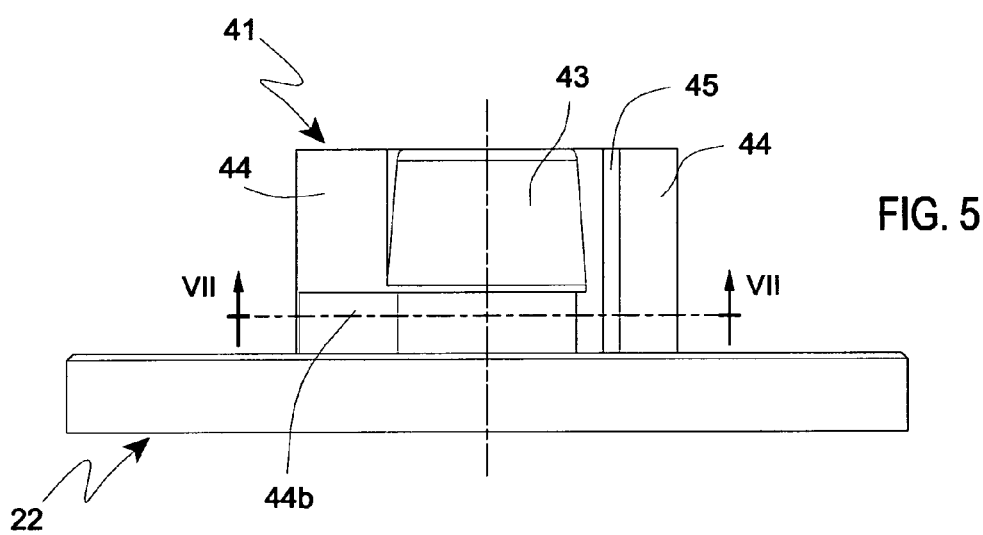
FIG. 5 is the view from V of FIG. 4.

Each sector of the cylindrical surface defines a hooking zone 43 (FIG. 3) for axially constraining the hooking teeth 31 in a snap-fastening, and a disengaging zone 44, located by the side of the hooking zone, destined to free the hooking teeth 31 from the engaging with the hooking zone 43 following a rotation, through a limited angle, of the cartridge 20 with respect to the upper cover 12.

Figure 6:
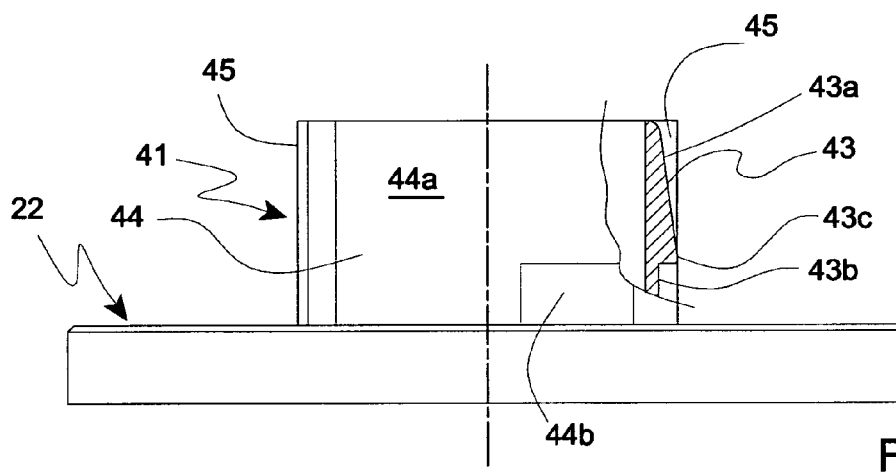
FIG. 6 is the view from VI of FIG. 4.

In particular, each hooking zone 43 defines (FIG. 6) in transversal section a second hooking tooth complementary to the first hooking teeth 31 and destined to receive and engage the first hooking teeth 31 in a snap-fastening following reciprocal nearing in an axial direction.

In more detail, the hooking zone 43 includes a slightly inclined upper portion 43a, a radius of which increases in a downwards direction, followed by a lower gully 43b which forms an edge 43d having a saw-tooth shape, destined to capture a first hooking tooth 31.

The disengaging zone 44 comprises a portion of entirely smooth cylindrical surface 44a, and a strip of arched surface 44b which forms a connecting ramp that lowers continuously, along the circumference of the gully 43b towards the surface portion 44a, which ramp is destined to transfer the hooking teeth from the gully 43b to the smooth cylindrical surface 44a.

Preferably the toothed gully 43b and the strip of surface 44b extend at a constant axial distance with respect to the hooking zone 43, such that the hooking tooth can slide along it without there being any need for any axial movement of the cartridge 20.

Further, a straight rib 45 located on the other side of the hooking zone 43 separates the hooking zone 43 of a sector from the disengaging zone 44 of the other sector, and projects radially externally with respect to the surrounding zones 43, and 44.

When the hooking teeth 31 engage with the respective edges 43d, they strike against the lower surface of the plate 22; thanks to this striking, the filter cartridge 20 is kept at the exact desired axial distance from the cover 12; further, the constraint between the hooking teeth 31 and the cylindrical body 41 is rendered completely free of play, as the edges 43d and the edges of the hooking teeth 31 are kept pushed against one another.

Four equidistant abutments 110 project from the base of the casing, which abutments 110 function as guides and radial constraints for the cartridge 20.

In use, to couple the filter cartridge 20 to the casing 11, the cartridge is inserted in the casing in an axial direction, by placing the hooking zones 43 onto the hooking teeth 31; the reciprocal coupling is achieved by snap-fastening of the projections of the teeth 31 in the gullies 43b.

The two hooking zones 43 function, together with the guide action produced by the ribs 45, as entry lanes for the hooking teeth 31, and enable secure pressure-fastening, without any need for excessive force to be used.

The rotation of the cartridge on the axis thereof during the application of pressure enables secure insertion into the entry slots.

The hooking is confirmed and indeed heard by a click of the teeth 31 in the gullies 43b.

From this stable position, the cartridge 20 cannot further move unless a correct disengaging action is exerted thereon.

The edge 43d prevents any unhooking of the cartridge 20 due to the forces generated by the pressure hikes internally of the complete filter group.

The separation of the cartridge 20 from the casing 11 is performed by a movement made up of two stages; in the first stage the cartridge 20 is rotated with respect to the casing (a relatively small torque is required) through a brief angle such as to cause the edges of the teeth 31 to slide on the respective connecting ramps (44b) with a consequent separating of the teeth 31 themselves) up to when the edges are on the smooth surface portions 44a.

As the toothed gullies 43b and the surface strips 44b extend at a constant axial distance with respect to the hooking zones 43, the hooking teeth 31 slide along them without any need for axial movement of the cartridge 20.

At this point, by pulling the cartridge 20 axially away from the casing 11, the teeth 31 detach from the tubular body 41 and the cartridge is separated from the casing.

In this way the filter means 21 can be gently separated from the filter casing without using force at the moment of the disengaging and therefore preventing exit of liquid and splashing of the liquid to the outside.

Figure 8:
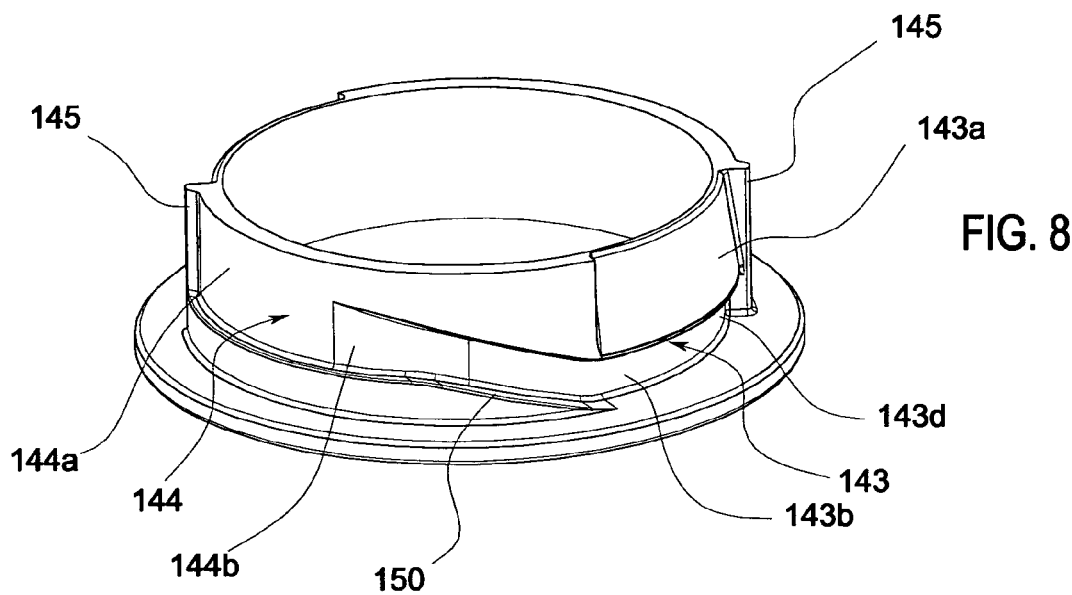
FIG. 8 is a variant of a detail of the invention.
Figure 9:
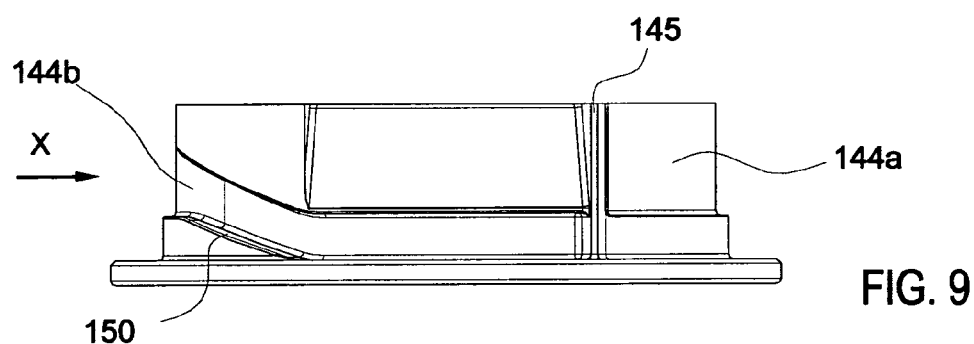
FIG. 9 shows the lateral view from IX of FIG. 10.
Figure 10:
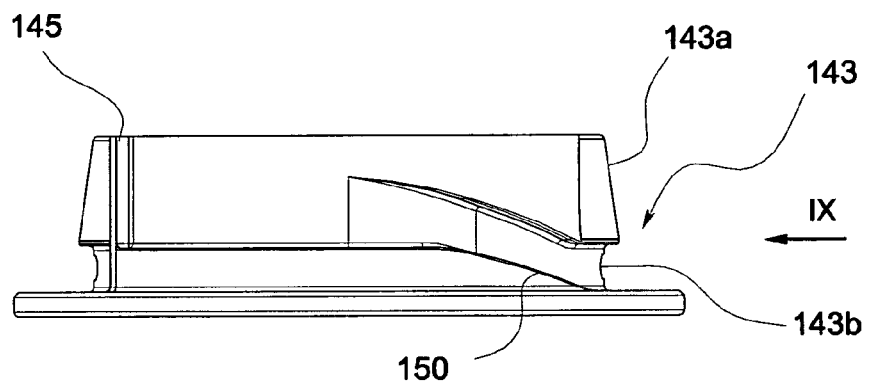
FIG. 10 shows the lateral view from X of FIG. 9.

In a further embodiment (FIGS. 8, 9, 10), the hooking zone 143 exhibits an upper portion 143a which is slightly inclined, the radius of which increases in a downwards direction, followed by a lower cylindrical gully 143b which forms an edge 143d having a sawtooth shape, destined to spear a first hooking tooth 31. The disengaging zone 144 comprises a portion of smooth cylindrical surface 144a, and an arched inclined gully 144b the base of which drops to the base of the gully 143b, and is destined to transfer the hooking teeth from the gully 143b to the smooth cylindrical surface 144a.

The gully 144b extends at least partially at a variable axial distance with respect to the hooking zone 143, such as to distance the filter cartridge 20 from the casing 11 during the unhooking rotation of the cartridge.

The gullies 143b and 144b preferably extend at least partially helically with respect to the position of the hooking zone 143.

With the aim of guaranteeing distancing of the filter cartridge 20 from the casing 11 during the disengaging rotation of the cartridge, a ramp 150 is provided between the base of the toothed gully 143b and the base of the gully 144b, which ramp 150 is used for the sliding of the hooking tooth 31.

Further, on the other side of the hooking zone 143 there is a straight ribbing 145 which separates the hooking zone 143 of a sector from the disengaging zone 144 of the other sector, and projects radially externally with respect to the surrounding zones 143, 144.

In use, in order to couple the filter cartridge 20 to the casing 11, the cartridge is inserted in the casing in an axial direction, causing the hooking zones 143 to encounter the hooking teeth 31; the reciprocal coupling is done by snap-insertion of the projections in the teeth 31 of the gullies 143b.

The two hooking zones 143 function, together with the guide action produced by the ribbings 145, as entry lanes for the hooking teeth 31, and enable a pressure-fit that is secure and which does not require excessive force.

The rotation of the cartridge on the axis thereof during the application of the pressure means that the entry lanes can be encountered securely.

The engagement is completed, and can be heard, by a snap entry of the teeth 31 in the gullies 143b.

From this stable position, the cartridge 20 cannot further move unless the correct disengaging movement is exerted thereon.

The edge 143d prevents any unhooking of the cartridge 20 as a result of the forces generated by pressure peaks internally of the complete filter group.

The separation of the cartridge 20 from the casing 11 is done by a two-step movement: in the first step the cartridge 20 is rotated with respect to the casing (a relatively small torque is required) over a small angle such as to case the edges of the teeth 31 to slide on the respective ramps provided by the gully 144b (with a consequent separation of the teeth 31 themselves) up until the edges become arranged on the smooth portions of surface 144a, and at the same time the filter cartridge 20 distances from the casing 11 during the unhooking rotation of the cartridge.

The toothed gully 143b and the gully 144b preferably extend at least partially helically with respect to the position of the hooking zone 143.

With the aim of ensuring the distancing of the filter cartridge 20 from the casing 11 during the unhooking rotation of the cartridge, the ramp 150 is provided adjacent to the toothed gully 143b and the arched surface 144b, which ramp 150 enables the sliding of the hooking tooth 31.

At this point, by axially pulling the cartridge 20 away from the casing 11, the teeth 31 detach from the tubular body 41 and the cartridge is separated from the casing.

In this way the filter means 21 can be gently separated from the filter casing without any great force on unhooking, preventing exit of liquids and projection thereof to the outside.

Obviously numerous modifications of a practical-applicational nature can be brought to the invention without its forsaking the ambit of protection as claimed herein below.

The invention claimed is:

1. A filter for internal combustion engines of vehicles, comprising:
    an external casing (11) and an upper closing cover (12), which close an internal chamber (13) having an inlet for the liquid to be filtered and an outlet for filtered liquid, the inlet for the liquid to be filtered and the outlet for the filtered liquid being located on the upper closing cover (12);
    a filter cartridge (20) having a tubular filter means (21) located internally of the internal chamber (13) which separates the chamber (13) into a first zone communicating with the inlet and a second zone communicating with the outlet, and a lower plate (22) joined to a lower end of the filter means (21),
    wherein the filter means (21) is removably fixed to the casing (11) such as to remain internally of the casing when the casing is separated from the cover, and
    wherein a base of the casing (11) comprises first hooking elements (31) comprising hooking teeth, developing axially and having an elastic action in a radial direction, and the lower plate (22) comprises second hooking elements (41) comprising a generally cylindrical surface sub-divided into a number of sectors which is equal to a number of hooking teeth (31),
    each sector defining a hooking zone (43, 143), defined by a toothed gully (43b, 143b), said toothed gully (43b, 143b) is configured to receive, in a snap-fastening, a projection of a first hooking tooth (31) that axially constrains the hooking teeth (31) and the base of the casing (11) to the lower plate (22),
    wherein each sector further defines a disengaging zone (44, 144), located by a side of the hooking zone (43, 143), configured to free the hooking teeth (31) from the engagement with the hooking zone (43, 143) following a rotation of the cartridge (20) through a limited angle with respect to the casing, the disengaging zone (44, 144) comprises a totally smooth cylindrical portion (44a, 144a), and an arched strip of surface (44b, 144b) which forms a connecting ramp configured to transfer the hooking teeth (31) from the toothed gully (43b, 143b) to the portion of smooth cylindrical surface (44a, 144a);
    wherein a ramp (150) is provided adjacent to the toothed gully (143b) and the arched strip of surface (144b), said ramp (150) is configured to enable the hooking tooth (31) to be slid.

2. The filter of claim 1, wherein the first hooking elements (31) are attached to said base of the casing (13) and project axially towards an inside of the chamber (13) and the generally cylindrical surface (41) is attached to the lower plate (22) and projects axially towards the base of the casing.

3. The filter of claim 1, wherein each of the hooking zones (43, 143) defines a second hooking tooth, complementary to the first hooking teeth (31) and configured to receive the first hooking teeth (3) in a snap-fastening following a reciprocal nearing in an axial direction, and an engaging of the first hooking teeth (3).

4. The filter of claim 1, wherein the arched strip of surface (44b, 144b) is fashioned on a bottom (15) of a gully (144b), the gully (144b) also develops in an axial direction and is located such as to be a continuation of the toothed gully (143b).

5. The filter of claim 1, wherein the toothed gully (143b) and the arched strip of surface (144b) at least partially extend helically with respect to the position of the hooking zone (143).

* * * * *